(12) United States Patent
Matsen et al.

(10) Patent No.: US 10,703,027 B2
(45) Date of Patent: Jul. 7, 2020

(54) INDUCTION HEATING CELLS INCLUDING PRESSURE BLADDERS

(71) Applicant: The Boeing Company, Chicago, IL (US)

(72) Inventors: Marc R. Matsen, Seattle, WA (US); David S. Nansen, Renton, WA (US); Lee C. Firth, Renton, WA (US); Carey E. Wilkinson, Summerville, SC (US); Gregory J. Hickman, University City, MO (US); William C. Dykstra, Rockford, MI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/563,093

(22) Filed: Sep. 6, 2019

(65) Prior Publication Data

US 2019/0389099 A1    Dec. 26, 2019

Related U.S. Application Data

(63) Continuation of application No. 14/945,615, filed on Nov. 19, 2015.

(51) Int. Cl.
*B29C 33/06* (2006.01)
*B29C 43/52* (2006.01)
(Continued)

(52) U.S. Cl.
CPC .............. *B29C 43/52* (2013.01); *B29C 33/06* (2013.01); *B29C 33/202* (2013.01);
(Continued)

(58) Field of Classification Search
CPC ....................................................... B29C 3/52
(Continued)

(56) References Cited

U.S. PATENT DOCUMENTS 5,558,015 A * 9/1996 Miyashita ............. B29C 43/203
100/211
5,591,370 A 1/1997 Matsen et al.
(Continued)

OTHER PUBLICATIONS

"Apparatus and Method for Forming Three-Sheet Panels", U.S. Appl. No. 14/827,711, filed Aug. 17, 2015, 42 pgs.
(Continued)

*Primary Examiner* — Christina A Johnson
*Assistant Examiner* — Xue H Liu
(74) *Attorney, Agent, or Firm* — Kwan & Olynick LLP

(57) ABSTRACT

Provided are induction heating cells including pressure bladders used for supporting dies and methods of using these induction heating cells. A pressure bladder may be disposed between a die and a bolster of the cell. Even when the bolster is deformed during operation of the cell, the pressure bladder continues to provide uniform support to the die thereby preserving integrity of the die and prevents its cracking or braking. As such, the cell may be operated at a higher processing pressure inside the cavity formed by the die without further strengthening the bolster. The bolster is allowed to deform without compromising the integrity of the die. The deformation of the bolster is compensated by the shape change of the pressure bladder. The number and/or position of the bladders in the cell may depend on the shape of processed parts.

20 Claims, 12 Drawing Sheets

(51) Int. Cl.
*B29C 35/08* (2006.01)
*B29C 33/20* (2006.01)

(52) U.S. Cl.
CPC .... *B29C 35/0805* (2013.01); *B29C 2033/205* (2013.01); *B29C 2035/0811* (2013.01)

(58) Field of Classification Search
USPC ....................................................... 264/319
See application file for complete search history.

(56) References Cited

U.S. PATENT DOCUMENTS

| | | |
|---|---|---|
| 5,599,472 A | 2/1997 | Brown et al. |
| 5,683,608 A | 11/1997 | Matsen et al. |
| 6,180,932 B1 * | 1/2001 | Matsen ............... B23K 1/002 219/615 |
| 10,464,240 B2 | 11/2019 | Matsen et al. |
| 2015/0013894 A1 | 1/2015 | Matsen et al. |
| 2017/0050229 A1 | 2/2017 | Matsen et al. |
| 2017/0144337 A1 | 5/2017 | Matsen et al. |

OTHER PUBLICATIONS

"U.S. Appl. No. 14/945,615, Non Final Office Action dated Mar. 5, 2019", 9 pages.
"U.S. Appl. No. 14/945,615, Notice of Allowance dated Jun. 14, 2019", 8 pgs.
"U.S. Appl. No. 14/945,615, Restriction Requirement dated Sep. 7, 2018", 4 pages.

* cited by examiner

INDUCTION HEATING CELLS INCLUDING PRESSURE BLADDERS

CROSS-REFERENCE TO RELATED APPLICATION

This application is a continuation of U.S. patent application Ser. No. 14/945,615, filed on Nov. 19, 2015, which is incorporated herein by reference in its entirety for all purposes.

BACKGROUND

Processing large parts and/or parts having complex shapes in pressurized tools can be very challenging. When a pressure is applied to a large surface of a tool, substantial forces may be generated and transferred to various supporting structures causing these structures to deform. Processing complex shapes may generate forces in many different complicating support functions. Furthermore, many materials used in these pressurized tools may not be able to support mechanical loads, such as tensile loads. For example, ceramic materials may be used in induction heating systems because many ceramic materials do not interact with electromagnetic radiation, which may be used for heating in these system. The ceramic materials allow electromagnetic waves to pass to other (e.g., internal) components of the tool to achieve, for example, localized heating. While ceramic materials can withstand high compressive loads, these materials are very brittle when subjected to tensile loads. Tensile loads may be generated when structures supporting ceramic components deform.

SUMMARY

Provided are induction heating cells including pressure bladders used for supporting dies and methods of using these induction heating cells. A pressure bladder may be disposed between a die and a bolster of the cell. Even when the bolster is deformed during operation of the cell, the pressure bladder continues to provide uniform support to the die thereby preserving integrity of the die and prevents its cracking or breaking. As such, the cell may be operated at a higher processing pressure inside the cavity formed by the die without further strengthening the bolster. The bolster is allowed to deform without compromising the integrity of the die. The deformation of the bolster is compensated by the shape change of the pressure bladder. The number and/or position of the bladders in the cell may depend on the shape of processed parts.

In some embodiments, a method for processing a part using an induction heating cell comprises positioning the part into a processing cavity formed by a first die and a second die and applying a processing pressure to the processing cavity while controlling a first pressure inside a first bladder and controlling a second pressure inside a second bladder. The first bladder may be disposed between the first die and a contact surface of a first bolster. The second bladder may be disposed between the second die and a contact surface of a second bolster.

In some embodiments, the ratio of the first pressure inside the first bladder to the second pressure inside the second bladder is kept constant. Furthermore, the ratio the first pressure inside the first bladder to the processing pressure inside the processing cavity is kept constant for at least a period of time while changing the processing pressure inside the processing cavity. In some embodiments, controlling the first pressure inside the first bladder comprises controlling amount of gas inside the first bladder. The first bladder and the processing cavity may be connected to a gas source. Alternatively, controlling the first pressure inside the first bladder and controlling the second pressure inside the second bladder comprises changing position of the first die relative to the second die. In some embodiments, controlling the first pressure inside the first bladder comprises controlling a distance between the contact surface of the first bolster and the first dies.

In some embodiments, the method further comprises controlling a third pressure inside a third bladder and controlling a fourth pressure inside a fourth bladder. The third bladder may be disposed between the first die and a contact surface of a third bolster. The fourth bladder may be disposed between the first die and a contact surface of a fourth bolster. The contact surface of the third bolster may be parallel to the contact surface of the fourth bolster. The contact surface of the first bolster may be perpendicular to the contact surface of the third bolster. In some embodiments, the third bladder is disposed between the second die and the contact surface of the third bolster. The fourth bladder may be also disposed between the second die and the contact surface of the fourth bolster. The third pressure inside the third bladder and the fourth pressure inside the fourth bladder may be independently controlled from the first pressure inside the first bladder and the second pressure inside the second bladder. In some embodiments, the ratio of the third pressure inside the third bladder to the fourth pressure inside the fourth bladder is kept constant.

In some embodiments, the contact surface of the first bolster is parallel to the contact surface of the second bolster prior to applying the processing pressure to the processing cavity. More specifically, each of the contact surface of the first bolster and the contact surface of the second bolster is substantially planar prior to applying the processing pressure to the processing cavity.

The contact surface of the first bolster may unevenly deform while applying the processing pressure to the cavity. The first bladder may fill all space between the contact surface of the first bolster and the first die above the cavity while the contact surface of the first bolster unevenly deforms away from the first die. The first bolster may be supported by at least one post relative to the second bolster. The first bolster may not apply a bending load onto the at least one post while the first bolster unevenly deforms away from the first die. The post has a cylindrical profile. The post protrudes through an opening in the first bolster. The opening has a cone profile.

In some embodiments, the method further comprises monitoring deformation of the first bolster while applying the processing pressure to the cavity. The first pressure inside the first bladder may be controlled based on applied pressure inside the forming cavity.

In some embodiments, the contact surface of the first bolster does not directly contact the first die while applying the processing pressure to the cavity. The contact surface of the second bolster may not directly contact the second die while applying the processing pressure to the cavity.

In some embodiments, the method further comprising inductively heating a portion of the first die and the second die. The inductive heating may be performed while applying the processing pressure to the processing cavity. The inductive heating may commence prior to applying the processing pressure to the processing cavity. The first die and the second die may be permeable to electromagnetic waves of the inductive heating. For example, the first die and the second die may each comprise one of a ceramic or a composite material. The inductive heating may comprise providing an alternating current to a coil extending through the first die and the second die. The alternating current may have a frequency of between about 1-50 kHz. The part may be inductively heated to at least about 500 F. The processing pressure may be at least about 100 psi.

In some embodiments, the part is a composite part. Applying the processing pressure to the processing cavity may be a part of curing the composite part. Alternatively, applying the processing pressure to the processing cavity is a part of superplastic forming. In some embodiments, the part is a non-planar part.

Provided also is an induction heating cell comprising a first die, a second die, a first bolster, a second bolster, a first bladder, and a second bladder. The first die and the second die may form a cavity. The first bolster may comprises a contact surface facing the first die. The second bolster may comprise a contact surface facing the second die. The first dies and the second die may be disposed between the contact surface of the first bolster and the contact surface of the second bolster. The first bladder may be disposed between the first die and the contact surface of the first bolster. The second bladder may be disposed between the second die and the contact surface of the second bolster.

In some embodiments, the induction heating cell further comprises a gas source connected to the first bladder for controlling a first pressure inside the first bladder and connected to the second bladder for controlling a second pressure inside the second bladder. The gas source may be coupled to the process cavity and used for controlling a processing pressure inside the processing cavity.

The induction heating cell may comprise a system controller for determining a first pressure inside the first bladder and controlling a second pressure inside the second bladder. The system controller may be configured to apply a processing pressure inside the processing cavity. The system controller may be configured to determine deformation of at least one of the first bolster or the second bolster.

In some embodiments, the induction heating cell also comprises a third bladder and a fourth bladder. The third bladder may be disposed between the first die and a contact surface of a third bolster, while the fourth bladder may be disposed between the first die and a contact surface of a fourth bolster. The contact surface of the third bolster may be parallel to the contact surface of the fourth bolster. The contact surface of the first bolster may be perpendicular to the contact surface of the third bolster. The third bladder may be also disposed between the second die and the contact surface of the third bolster. The fourth bladder may be also disposed between the second die and the contact surface of the fourth bolster. In some embodiments, the third pressure inside the third bladder and the fourth pressure inside the fourth bladder are independently controlled from a first pressure inside the first bladder and a second pressure inside the second bladder.

In some embodiments, the contact surface of the first bolster is substantially parallel to the contact surface of the second bolster. The first bolster may be supported by at least one post relative to the second bolster. The post may have a cylindrical profile. The post may protrude through the opening in the first bolster. The opening may have a cone profile.

In some embodiments, the induction heating cell also comprises an inductive coil disposed within the first die and the second die. The processing cavity may be non-planar. The first die and the second die may each be comprised of a ceramic or a composite material.

These and other embodiments are described further below with reference to the figures.

DETAILED DESCRIPTION

Figure 1A:
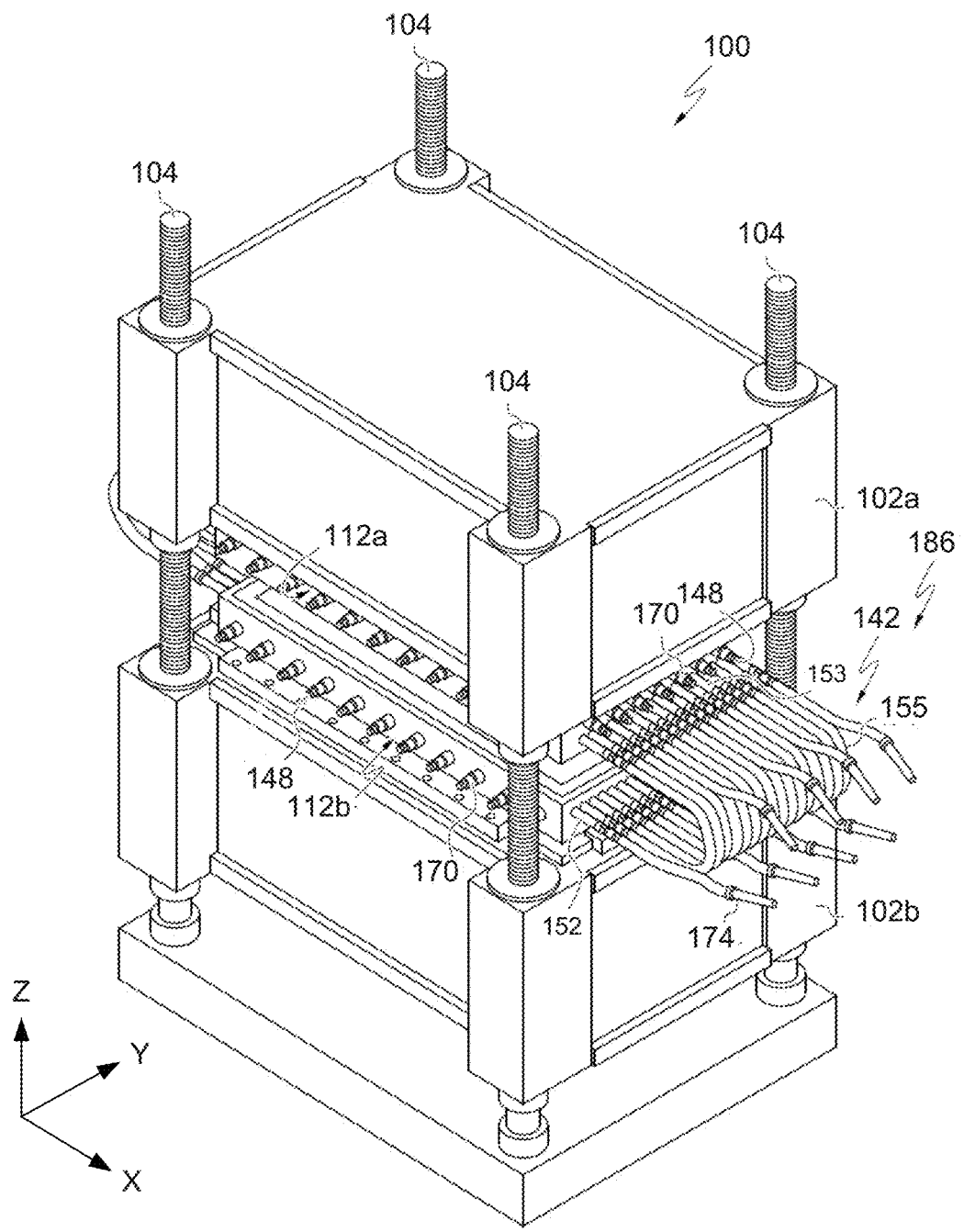
FIG. 1A is a schematic perspective view of an induction heating cell, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

An induction heating cell may include two or more ceramic or composite dies forming a processing cavity for receiving parts processed using the cell. The induction heating cell may also include induction coils integrated into the dies. This cell can be used for consolidation and/or curing of thermoplastic and other composites. In some embodiments, the cell may be used for superplastic forming of titanium parts and/or other metal parts. One having ordinary skill in the art would understand that other applications of the induction heating cell are also within the scope of this disclosure.

During operation of the cell, the induction coil generates an oscillating electromagnetic field, which can pass though the dies without much interference. The material of the die may be specifically selected to allow this unobstructed passage of the electromagnetic radiation. The induction heating cell and/or the processed part may include susceptors that absorb the electromagnetic energy of the field and converts this energy into the localized heat. As such, the processed part can be heated without heating most of the induction heating cell. This localized heating approach eliminates a substantial thermal mass from the overall cell and allows quick heating up and cooling down cycles. Not only processing throughput and efficiencies are substantially increased in comparison to convection or other types of heating, but this approach also results in substantial energy savings.

During processing, the dies may be subjected to various loads generated, for example, by pressing the dies against each other and/or by pressurizing a processing cavity formed by the dies. As noted above, the material of the dies, such as ceramic or composite materials, are not susceptible to inductive heating. Furthermore, these materials may have small coefficients of thermal expansion and heat transfer and may be, resistant to a thermal shock. Finally, the materials may have high compression strength. However, these materials may easily crack when subjected to tensile loads. To address these issues, the dies may be reinforced with fiberglass rods and posts tensioned to apply compressive forces to the ceramic dies. While this approach works well for planar parts, it does not work well for curved parts. The tooling tolerances may be less than about 0.020 inches or even less than about 0.010 inches.

When parts with complex geometries (e.g., highly convoluted parts) are being processed using an induction heating cell, tensile loads applied to the dies of the cell should be minimized. Achieving this goal can be challenging because even minor bending of supporting components, e.g., bolster, may cause large tensile loads. Overall, the loads applied to the induction heating cell and its component when processing large and/or convoluted parts can be non-uniform and may change as a result of bending.

It has been found that positioning a pressure bladder between a die and its supporting structure (e.g., a bolster) provides uniform support to the die regardless of the deformation of the supporting structure. The pressure bladder may occupy the entire space between the die and supporting structure (at least corresponding to a projection of the processing cavity) even when the supporting structure deforms. Specifically, the pressure bladder changes its shape together with the deformation of the supporting structure and ensure continuous uniform support to the die.

Any number of pressure bladders may be provided in the same induction heating cell. The pressure bladders may be sized and located based on the design of the processing cavity and, more specifically, based on evaluating the induction heating cell and determining the development of tensile loads acting on the ceramic dies during processing.

In some embodiments, the method of using an induction heating cell may involve supplying a gas into a processing cavity to pressurize this cavity or, more specifically, to pressurize the part disposed within the cavity and being processed using the induction heating cell. The same or a different gas may be used for pressurizing bladders. In some embodiments, the amount of gas within the pressure bladders may change during operation of the induction heating cell and may depend, for example, on the processing pressure inside the cavity. This feature may be also used to advance dies with respect to each other and/or to balance the force generated while pressurizing the processing cavity. As such, the bladders may be pressurized in concert with pressurizing the processing cavity thereby ensuring that only compressive loads are being applied to the ceramic dies. Alternatively, the amount of gas in the bladders may remain constant and the pressure is controlled by changing the volume of the bladders. For example, supporting structures may be advanced in concert with pressurizing the processing cavity.

Without being restricted to any particular theory, it is believed that pressure bladders disposed between dies and bolsters provide uniform support (e.g., exert evenly distributed force/pressure) to the dies while the bolsters are allowed to bend. To accommodate some bending, the openings in the bolsters that accept restraint posts may be conical in shape or at least some additional space for the posts to occupy as the bolsters are bending. This feature allows the bolsters to bend but without applying bending loads on the posts.

Examples of Systems and Methods of Using Such Systems

Figure 1B:
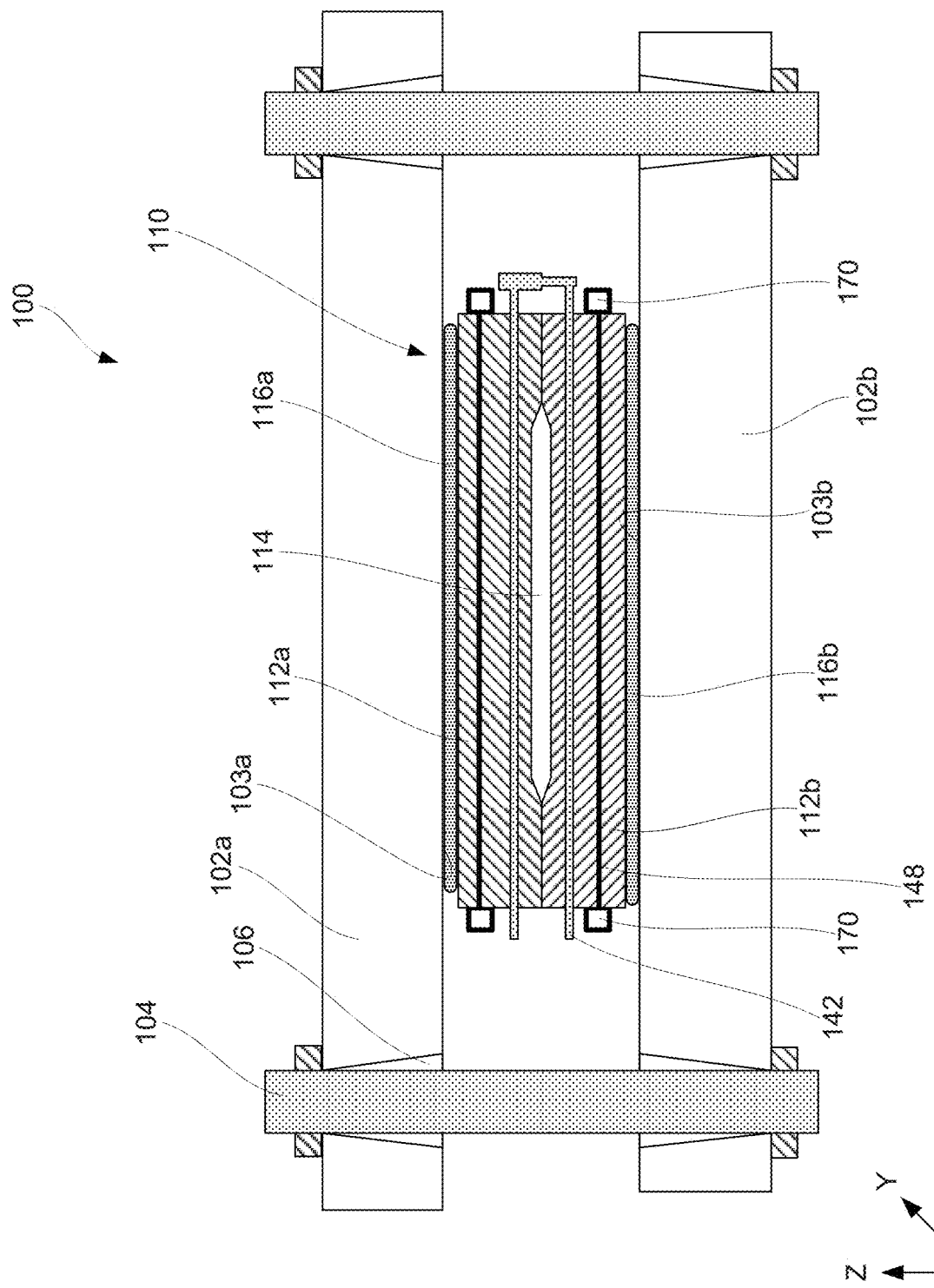
FIG. 1B is a schematic cross-sectional view of an induction heating cell, in accordance with some embodiments.
Figure 1C:
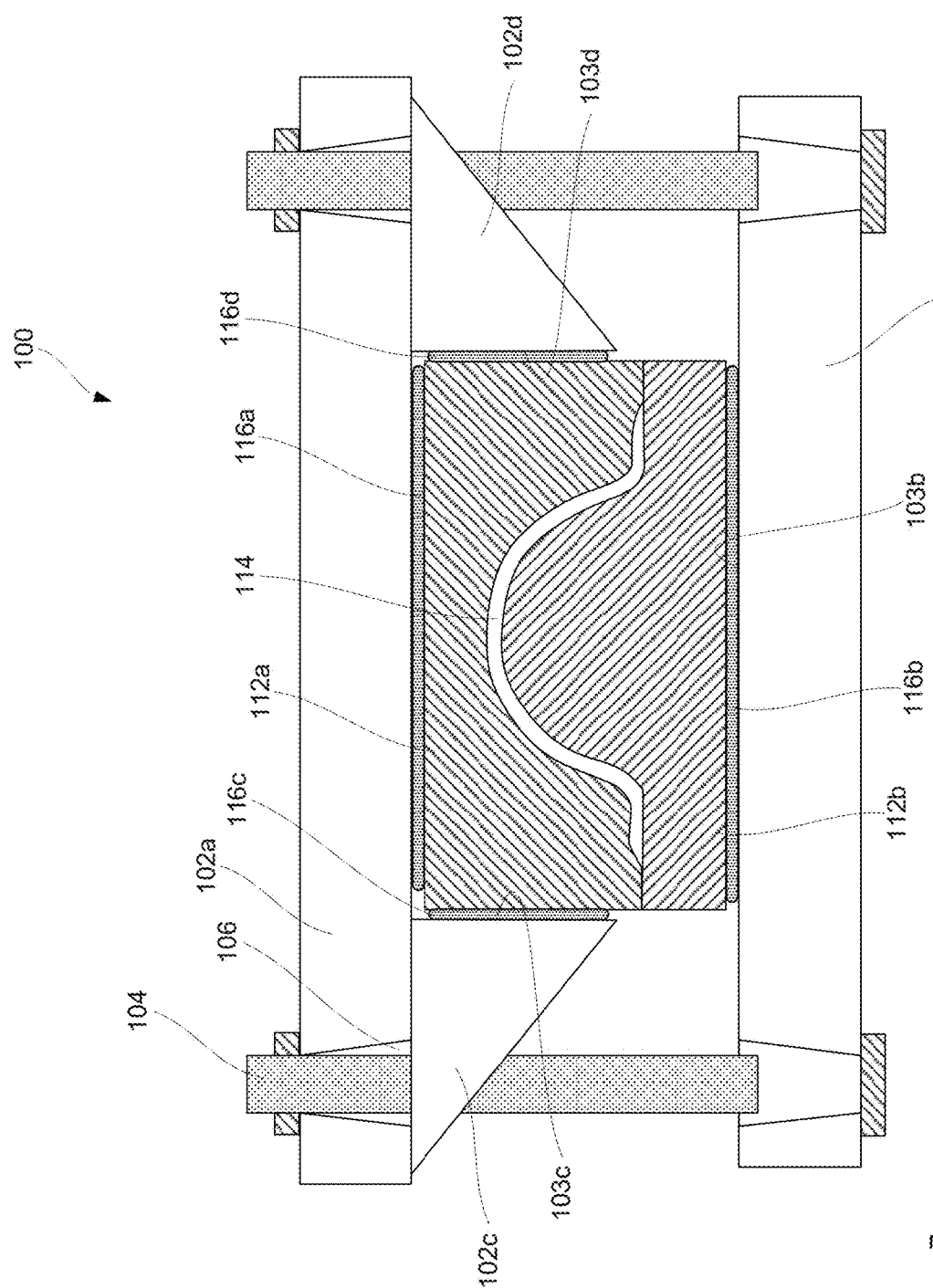
FIG. 1C is a schematic cross-sectional view of another induction heating cell, in accordance with some embodiments.
Figure 1D:
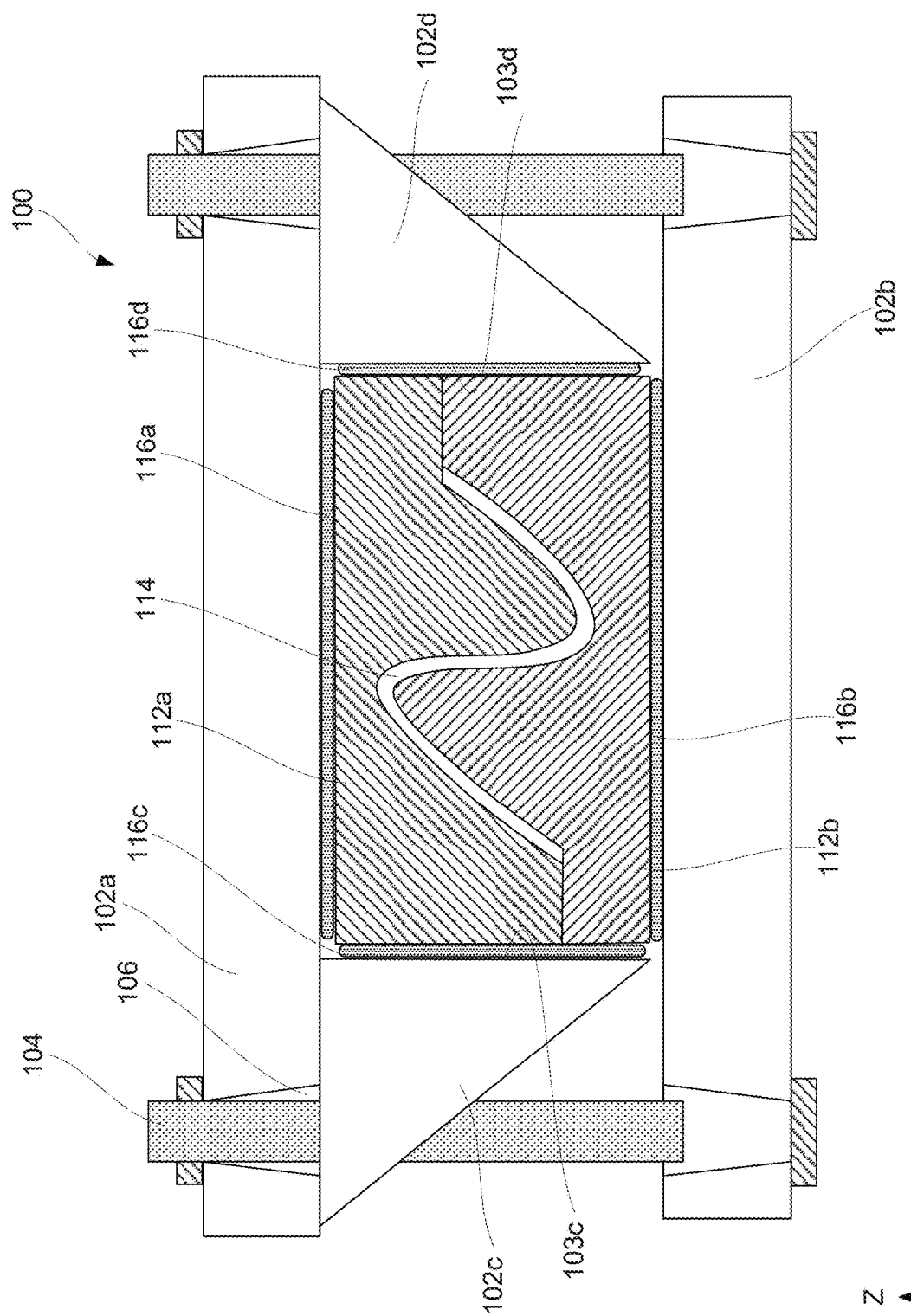
FIG. 1D is a schematic cross-sectional view of yet another induction heating cell, in accordance with some embodiments.

FIG. 1A is a schematic perspective view of induction heating cell 100, in accordance with some embodiments. Induction heating cell 100 includes first die 112*a* and second die 112*b*. Depending on the orientation of induction heating cell 100, first die 112*a* may be also referred to as an upper die, while second die 112*b* may be referred to as a lower die. First die 112*a* and second die 112*b* in combination define processing cavity 114 as illustrated in FIGS. 1B and 1C. Processing cavity 114 is shaped to correspond to a part being processed in processing cavity 114. For example, FIG. 1B illustrates processing cavity 114 used for planar parts, while FIGS. 1C and 1D illustrate processing cavities 114 for non-planar parts. Because processing cavity 114 may be pressurized during processing, different forces will act on first die 112*a* shown in FIG. 1B in comparison to first die 112*a* shown in FIG. 1C or first die shown in FIG. 1D. For example, first die 112*a* shown in FIG. 1B will experience forces primarily in the Z direction, at least prior to bending of first bolster 102*a*. On the other hand, first die 112*a* shown in FIG. 1C will experience forces in both Z and X directions. One having ordinary skill in the art would understand the three dimensional aspects of the force distribution and examples when first die 112*a* will also experience forces in the Y direction. Furthermore, one having ordinary skill in the art would understand the forces applied to second die 112*a* and support need for this die 112*a*. As such, other configurations of processing cavities 114, corresponding first dies 112*a* and second dies 112*b*, and support to these dies (further described below) are within the scope of this disclosure.

First die 112*a* and second die 112*b* may be positioned between first bolster 102*a* and second bolster 102*b* as shown in FIGS. 1A-1D. Depending on the orientation of induction heating cell 100, first bolster 102*a* may be also referred to as an upper bolster or an upper strongback, while second bolster 102*b* may be referred to as a lower bolster 102*b* or a lower strongback. First bolster 102*a* and second bolster 102b may be formed of steel, aluminum, or any other material capable of handling the loads present during panel forming. In some embodiments, a non-magnetic material, such as aluminum or some steel alloys, may be used for bolsters 102a and 102b to avoid any distortion to the magnetic field produced by induction coils 142, as described below.

Induction coils 142 may be integrated into first die 112a and second die 112b, for example, shown in FIG. 1B. For simplicity and clarity of FIGS. 1C and 1D, induction coils are not shown in these figures. Referring to FIG. 1A, induction coils 142 may be a part of heating system 186 used for heating the part disposed within processing cavity 114. Induction coils 142 may extend longitudinally through the length of first die 112a adjacent to processing cavity 114 and through the length of second die 112b adjacent to processing cavity 114. As one example, induction coils 142 may be embedded within and extend through an interior of dies 112a and 112b. In some embodiments, each of dies 112a and 112b holds straight tubing sections 153 of induction coils 142 in proper position in relationship to susceptor liners forming processing cavity 114. Specifically, each induction coil 142 may be formed from straight tubing sections 153 that extend along the length of each of dies 112a and 112b and flexible coil connectors 155 that join straight tubing sections 153 in first die 112a to straight tubing sections 153 in second die 112b.

Induction coils 142 may be connected to an external power source (e.g., a coil driver) and, in some embodiments, to a source of coolant. Connectors 174 located at the ends of inductive coils 142 may be used for these purposes. As such, induction coils 142 may also remove thermal energy by serving as a conduit for a coolant fluid, such as water. As one example, four separate induction coils 142 may be used. However, other numbers of induction coils 142 may also be used without limitation.

Referring to FIGS. 1A and 1B, dies 112a and 112b may be reinforced with fiberglass rods 148. Fiberglass rods 148 may extend both longitudinally and/or transversely in a grid through each of dies 112a and 112b to increase the strength of dies 112a and 112b. As one example, fiberglass rods 148 extend both longitudinally and transversely each of dies 112a and 112b. After casting the interior of dies 112a and 112b, fiberglass rods 148 may be post-tensioned through the use of tensioning nuts 170. Post-tensioning fiberglass rods 148 maintains a compressive load on dies 112a and 112b to prevent cracking or damage of dies 112a and 112b during operation of induction heating cell 100.

First bolster 102a and second bolster 102b may be supported with respect to each other using posts 104. Posts 104 may be threaded. For example, jackscrews may be used as posts 104. In some embodiments, first bolster 102a and second bolster 102b may be threadably coupled to each of posts 104 using threads on first bolster 102a and second bolster 102b or a set of nuts. With this threadable coupling, posts 104 may be used to change the distance between first bolster 102a and second bolster 102b, e.g., by turning posts 104 using a bellows or other actuation mechanisms. Movement of first bolster 102a and second bolster 102b move respective first die 112a and second die 112b in relation to each other to form processing cavity 114. Furthermore, movement of first bolster 102a and second bolster 102b may be used to control the pressure inside first bladder 116 and second bladder 116a as further described below.

As shown in FIG. 1B, first bolster 102a has first contact surface 103a facing first die 112a, while second bolster 102b has second contact surface 103b facing second die 112b. Conventionally, bolsters come in direct contact with dies and have to be rigid and be able to maintain their surfaces substantially flat (e.g., within the planar deviation of 0.003 inches per square foot or less) to prevent bending and/or cracking of the dies. This approach requires bulky bolsters, posts, and other components and is generally limited to small dies. Even small deformation of a bolster may create highly undesirable tensile loads within the dies.

In order to maintain even support to first die 112a and second die 112b without requiring first bolster 102a and second bolster 102b to remain substantially flat, induction heating cell 100 may include pressure bladders 116a and 116b. Specifically, first bladder 116a may be positioned between first bolster 102a and first die 112a, while second bladder 116b may be positioned between second bolster 102b and second die 112b. First bladder 116a may be in direct contact with one of first bolster 102a or first die 112a (e.g., at least first bolster 102a) or both first bolster 102a or first die 112a. Likewise, second bladder 116b may in direct contact between the second bolster 102b or second die 112b (e.g., at least second bolster 102b) or both second bolster 102b or second die 112b. Despite first bolster 102a and second bolster 102b not being substantially flat (e.g., the planar deviation of at least about 0.005 inches per square foot or even of at least about 0.010 inches per square foot), first die 112a and second die 112b experience uniform support. In some embodiments, the maximum planar deviation of first bolster 102a and second bolster 102b may be set by the maximum thickness of first bladder 116a and second bladder 116b.

Pressure bladders 116a and 116b may have the same size and construction or different sizes and/or construction. Referring to FIG. 1B, pressure bladders 116a and 116b may be greater than the projection of processing cavity 114 in the Z direction. As such, pressure bladders 116a and 116b may provide support to dies 112a and 112b over the area larger than the area of processing cavity 114 (the areas being parallel to the X-Y plane).

In some embodiments, pressure bladders 116 and 116b may be made from a thin metal (e.g., steel) or polymer. The selection of the material for pressure bladders 116a and 116b may depend on the operating temperatures and/or pressure. In some embodiments, even though the part may be heated to at least about 500 F, the temperature of pressure bladders 116a and 116b may be less than 200 F. In fact, the temperature variation of pressure bladders 116a and 116b during operation of induction heating cell 100 may be less than 100 F or even less than 50 F to ensure that this temperate variation does not cause undesirable pressure variations (e.g., when no gas is added or removed from pressure bladders 116a and 116b).

In some embodiments, first die 112a and first bladder 116a may be attached to first bolster 102a such that when first bolster 102a moves away from second bolster 102b, first bolster 102a is also able to lift first die 112a and first bladder 116a away from second die 112b. Any suitable fastening devices, such as bolting or clamping, may be used for this purpose. It should be noted that this attachment may not transfer any substantial force when first die 112a is pressed against second die 112b and/or when a processing pressure is applied into processing cavity 114. During such operations, substantially all support (e.g., more than 90%) is provided by first bladder 116a. In other words, a suitable fastening device may allow for changes in the gap between first bolster 102a and first die 112a thereby allowing deformations of first bolster. The same or similar fastening device may be used to support second die 112*b* and second bladder 116*b* relative to second bolster 102*b*.

Figure 1E:
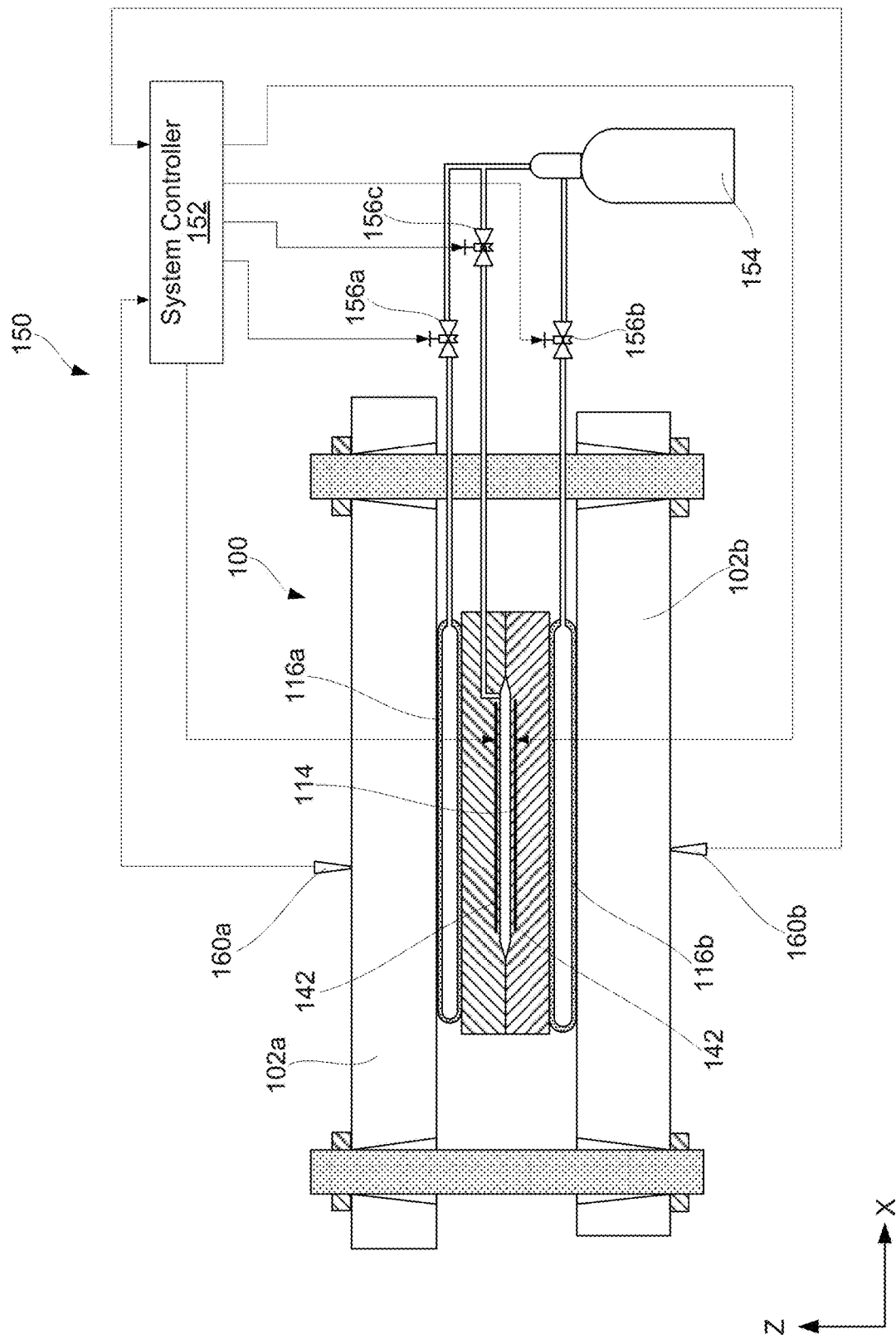
FIG. 1E is a schematic view of an induction heating system including an induction heating cell and other components, in accordance with some embodiments.

Referring to FIG. 1E, induction heating system 150 or induction heating cell 100 may include gas source 154 coupled to first bladder 116*a* and second bladder 116*b*. Gas source 154 may be used for controlling the pressure inside first bladder 116*a* and controlling the pressure inside second bladder 116*b* using, for example, valves 156*a* and 156*b*, respectively. In some embodiments, system controller 152 may control valves 156*a* and 156*b*. Gas source 154 may be also coupled to processing cavity 114 for controlling the pressure inside processing cavity 114 using, for example, valve 156*c* as shown in FIG. 1E. In other words, the same gas may be used for pressurizing bladders 116*a* and 116*b* and cavity 114.

System controller 152 may be configured to apply the desired pressure inside first bladder 116*a* and use this information for controlling the pressure inside second bladder 116*b*. In some embodiments, system controller 152 may be configured to apply the pressure inside second bladder 116*b* and use this information for controlling the pressure inside first bladder 116*a*. Other factors used by system controller 152 to control the pressure inside first bladder 116*a* and/or to control the pressure inside second bladder 116*b* may include, but are not limited to the pressure inside processing cavity 114, deformation of first bolster 102*a* and/or second bolster 102*b*, temperature of various components of system 150, and the like.

Referring to FIGS. 1C and 1D, induction heating cell 100 may comprise third bladder 116*c* and fourth bladder 116*d*. Third bladder 116*c* may be disposed between the first die 112*a* and contact surface 103*c* of third bolster 102*c*. Fourth bladder 116*d* may be disposed between first die 112*a* and contact surface 103*d* of fourth bolster 102*d*. The number and position of additional pressure bladders may be determined by loads applied to dies 112*a* and 112*b*. For example, die 112*a* shown in FIG. 1C may experience loads along both X and Z axis because of the shape of processing cavity 114. It should be noted that while first die 112*a* may be supported by third bolster 102*c* and fourth bolster 102*d* in addition to first bolster 102*a*, second die 112*b* may be supported by only second bolster 102*b*.

Contact surface 103*c* of third bolster 102*c* may be parallel to contact surface 103*d* of fourth bolster 102*d*. This parallel orientation of contact surfaces 103*c* and 103*d* used for supporting die 112*a* may be used to minimize tensile load components. In some embodiments, contact surface 103*a* of first bolster 102*a* may be perpendicular to contact surface 103*c* of third bolster 102*c*.

Referring to FIG. 1D, third bladder 116*c* may be also disposed between second die 112*b* and contact surface 103*c* of third bolster 102*c* while fourth bladder 116*d* may be also disposed between second die 112*b* and contact surface 103*d* of fourth bolster 102*d*. In this case, bladders 116*c* and 116*d* may be used to support both dies 112*a* and 112*b*. Contact surface 103*b* of second bolster 102*b* may be perpendicular to contact surface 103*c* of third bolster 102*c*. In some embodiments, contact surface 103*a* of first bolster 102*a* is substantially parallel to contact surface 103*b* of second bolster 102*b* regardless of the presence of bladders 116*c* and 116*d*.

In some embodiments, the pressure inside third bladder 116*c* and the pressure inside fourth bladder 116*d* may be independently controlled from the pressure inside first bladder 116*a* and the pressure inside second bladder 116*b*. The ratio of the pressure inside third bladder 116*c* to the pressure inside fourth bladder 116*d* may be kept constant. Furthermore, the pressure inside third bladder 116*c* and the pressure inside fourth bladder 116*d* may depend on the pressure inside first bladder 116*a*, the pressure inside second bladder 116*b*, and/or the processing pressure inside processing cavity 114.

Figure 4A:
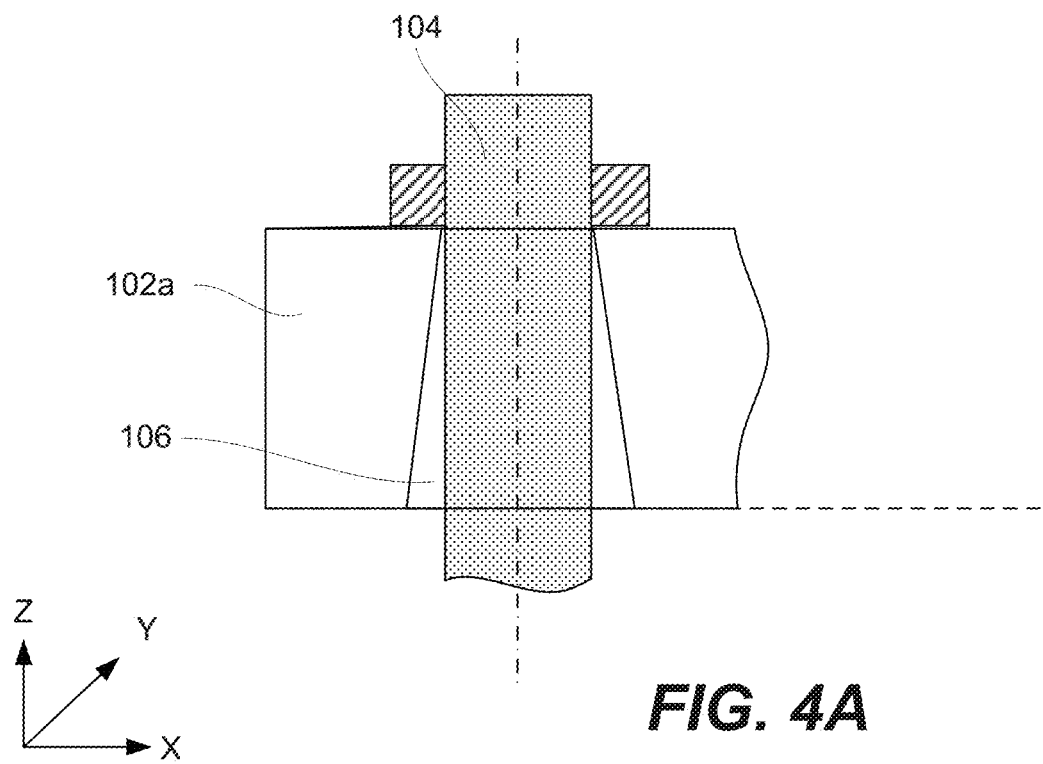
FIG. 4A is a schematic cross-sectional view of a post and a bolster prior to deforming the bolster, in accordance with some embodiments.
Figure 4B:
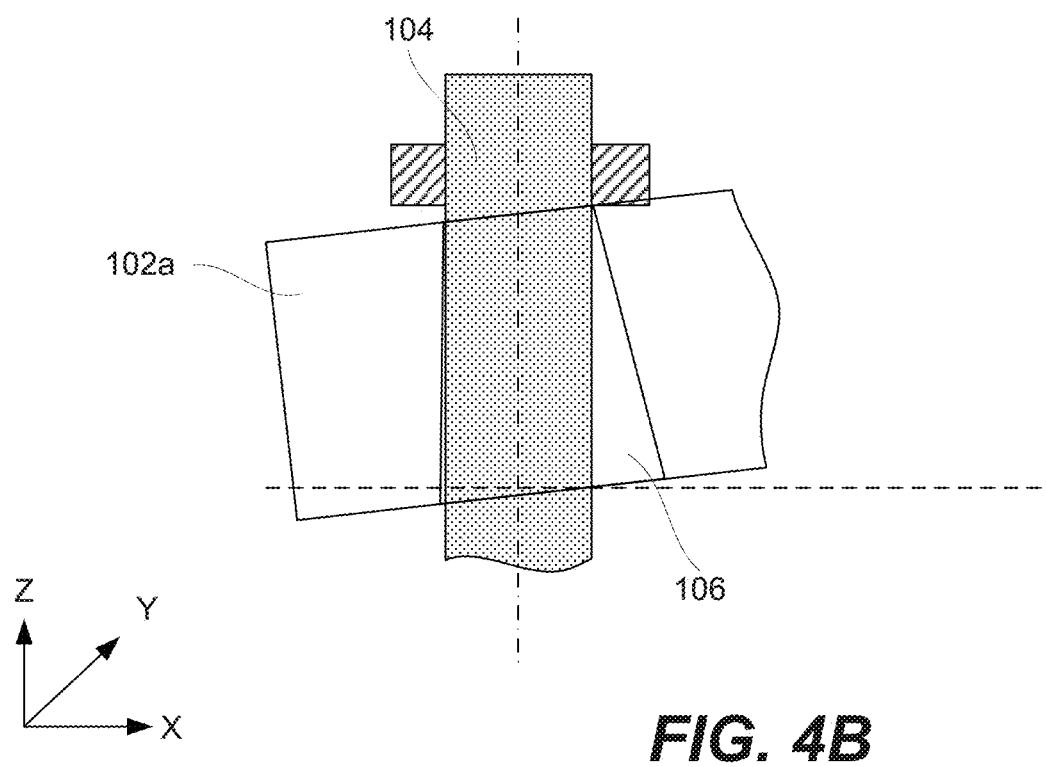
FIG. 4B is a schematic cross-sectional view of the post and the bolster of FIG. 4A after deforming the bolster, in accordance with some embodiments.

In some embodiments, first bolster 102*a* is supported by at least one post 104 relative to second bolster 102*b*. For example, FIG. 1A illustrates four posts 104 supporting first bolster 102*a* relative to second bolster 102*b*, but one having ordinary skill in the art would understand that any number of posts 104 may be used. Post 104 may have a cylindrical profile and may protrudes through opening 106 in first bolster 102*a* as, for example, shown in FIGS. 1C, 4A, and 4B. Opening 106 may have a cone profile thereby allowing first bolster 102*a* to deform without applying bending loads to post 104 as schematically shown in FIGS. 4A and 4B. More generally, the cross-sectional profile of opening 106 may be larger than the cross-sectional profile of post 104 thereby allowing first bolster 102*a* to deform. The same feature may be used on second bolster 102*b* as well.

Figure 2:
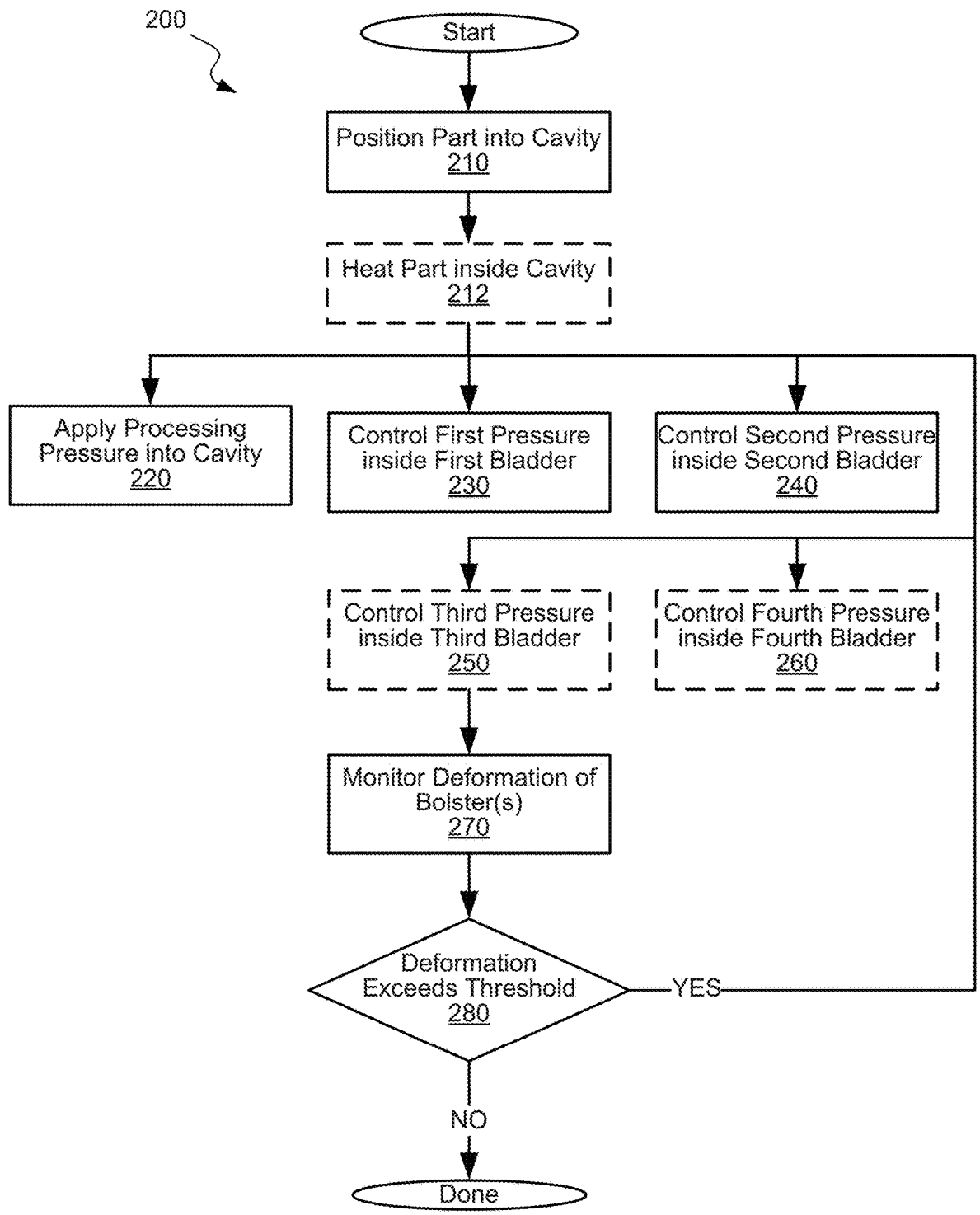
FIG. 2 is a process flowchart corresponding to a method for processing a part using an induction heating cell, in accordance with some embodiments.

FIG. 2 is a process flowchart corresponding to method 200 for processing a part using induction heating cell 100, in accordance with some embodiments. Various examples of induction heating cell 100 and its components are described above.

Method 200 may commence with positioning the part into processing cavity 114 (referring to block 210 in FIG. 2). As described above, processing cavity 114 may be formed by first die 112*a* and second die 112*b*. During this operation, first die 112*a* may be moved away from second die 112*b* (e.g., lifted by first bolster 102*a*) such that a sufficient space is available between first die 112*a* and second die 112*b* to advance the part towards portions of dies 112*a* and 112*b* forming processing cavity 114. The part may be positioned into a portion of processing cavity 114 formed by either first die 112*a* or second die 112*b*. The part may be a composite layup for consolidation and/or cure, a metal part to be formed and/or heat treated. Some examples of parts that may be processed using this method and system include, but not limited to, thermoplastic composite wing structures, air vehicle body panels (e.g., made via super-plastically formed titanium), thermoplastic composite fuselage sections, hot formed metallic engine nacelle components, and the like. At the end of operation 210, first die 112*a* and second die 112*b* may be brought closer together such that processing cavity 114 is formed. In some embodiments, when two dies 112*a* and 112*b* are brought together to seal processing cavity 114, the compression force applied to dies 112*a* and 112*b* may be negligible in comparison to the forces generated when the pressure is applied to processing cavity 114.

Method 200 may comprise heating the part while the part is inside processing cavity 114 of induction heating cell 100. This heating may be performed prior to applying a processing pressure to processing cavity 114 (referring to block 212 in FIG. 2), while applying the processing pressure to processing cavity (referring to block 220 in FIG. 2), or in both instances as will now be described with reference to FIGS. 5A and 5B.

Figure 5A:
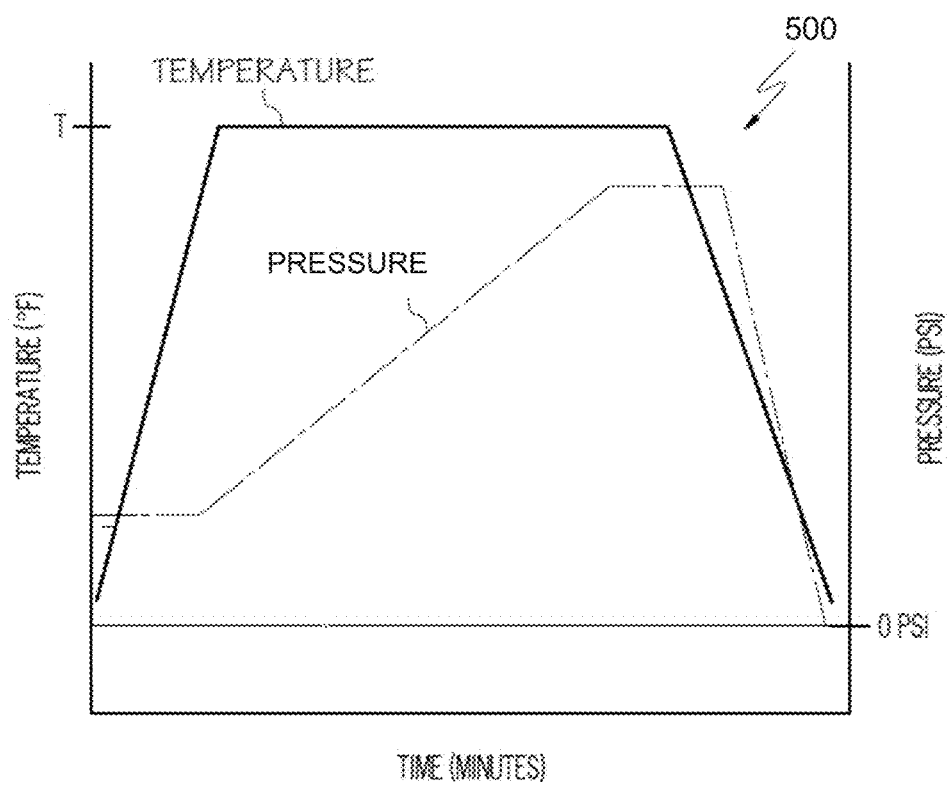
FIGS. 5A and 5B are examples of pressure and temperature profiles applied to the part processed used an induction heating cell, in accordance with some embodiments.
Figure 5B:
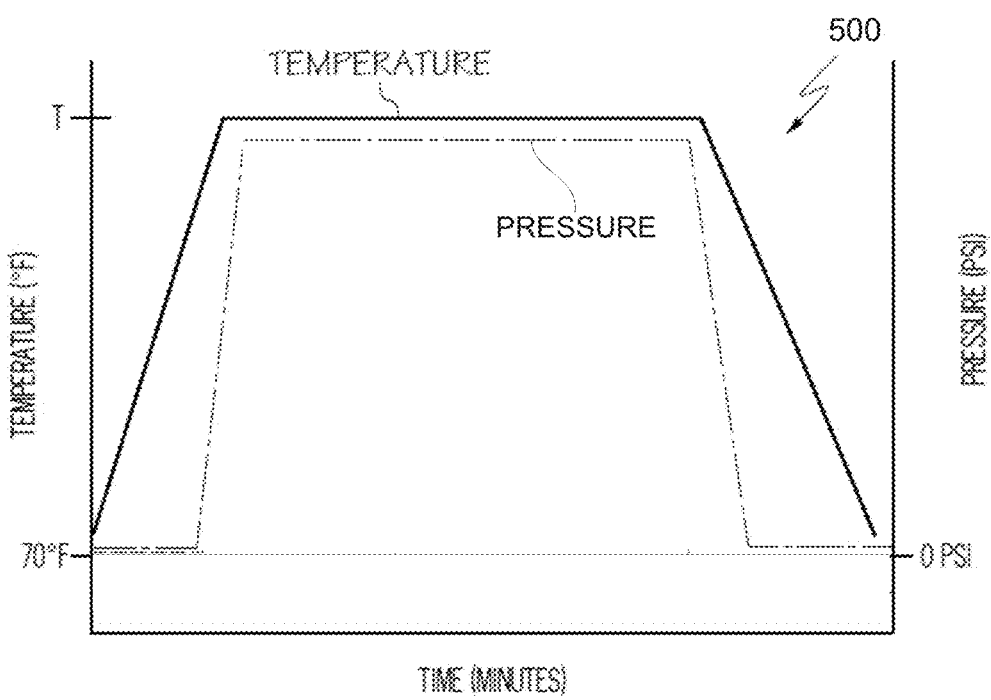

Specifically, FIGS. 5A and 5B illustrate two examples of temperature and pressure profiles 500. Referring to FIG. 5A, the processed part is heated by heating system 186 (e.g., induction coils 142) to its processing temperature T. Once heated to that temperature T, the pressure is applied to the part disposed inside processing cavity 114. For example, when forming a metal part at an elevated temperature or consolidating and/or curing a thermoplastic composite, processing cavity 114 may be pressurized. FIG. 5B is another example of temperature and pressure profiles 500.

Heating the part may expedite the curing process and/or make the part more conformal when, for example, the processing pressure is later applied. Heating the part may involve passing the electrical current through the induction coils of induction heating cell 100. More specifically, heating may be inductive heating. First die 112a and second die 112b may be permeable to electromagnetic waves of the inductive heating. Specifically, first die 112a and second die 112b may each be comprised of a ceramic or a composite material. The inductive heating may comprise providing an alternating current to induction coil 142 extending through first die 112a and second die 112b. The alternating current may have a frequency of between about 1-50 kHz. The part may be inductively heated to at least about 500 F.

Method 200 may proceed with applying a processing pressure to processing cavity 114, referring to block 220 in FIG. 2. Specifically, processing cavity 114 may be connected to an external gas source. In some embodiments, the processing pressure is constrained to processing cavity 114. In other words, the ambient pressure outside of first die 112a and second die 112b may be different (e.g., less) that the processing pressure inside processing cavity 114. In some embodiments, the processing pressure is between about 50 psi and 500 psi or, more specifically, between about 100 psi and 400 psi, such as at least about 100 psi or even at least about 150 psi or at least about 200 psi.

In some embodiments, applying the processing pressure to cavity 114 may be performed while controlling the first pressure inside first bladder 116a and controlling the second pressure inside second bladder 116b (referring to blocks 230 and 240 in FIG. 2). As described above, first bladder 116a may be disposed between first die 112a and first bolster 102a or, more specifically, between first die 112a and contact surface 103a of first bolster 102a. Second bladder 116b may be disposed between second die 112b and second bolster 102b or, more specifically, between second die 112b and contact surface 103b of second bolster 102b. Specifically, the pressure inside both bladders 116a and 116b may be self-controlled by changing the average thickness of bladders 116a and 116b. For example, the relative position of bolsters 102a and 102b may be adjusted. Alternatively, the pressure inside both bladders 116a and 116b may be controlled by adding or removing gas from bladders 116a and 116b. In some embodiments, controlling the pressure inside bladders 116a and 116b is performed in such a way that the relative position of first die 112a and second die 112b remain the same as the processing pressure is applied into processing cavity 114 during operation 220.

In some embodiments, the ratio of the first pressure inside first bladder 116a to the second pressure inside second bladder 116b is kept constant during operation 220. This ratio ensures the force balance within induction heating cell 110 such that a combination of first die 112a and second die 112b remains stationary relative to both bolsters 102a and 102b. The ratio may depend on the size of each of first bladder 116a and second bladder 116b or, more specifically, on the area of first bladder 116a contacting first die 112a and on the area of second bladder 116b contacting second die 112b. In some embodiments, the ratio of the first pressure to the second pressure is between 0.9 and 1.1 or, more specifically, between 0.95 and 1.05, such as about 1. In some embodiments, the ratio of the first pressure to the second pressure is kept constant for at least a period of time while changing the processing pressure inside processing cavity 114.

Contact surface 103a of first bolster 102a may be substantially parallel to contact surface 103b of second bolster 102b. However, when the processing pressure is applied to processing cavity 114, one or both of contact surfaces 103a and 103b may deform and become non-planar.

Figure 3A:
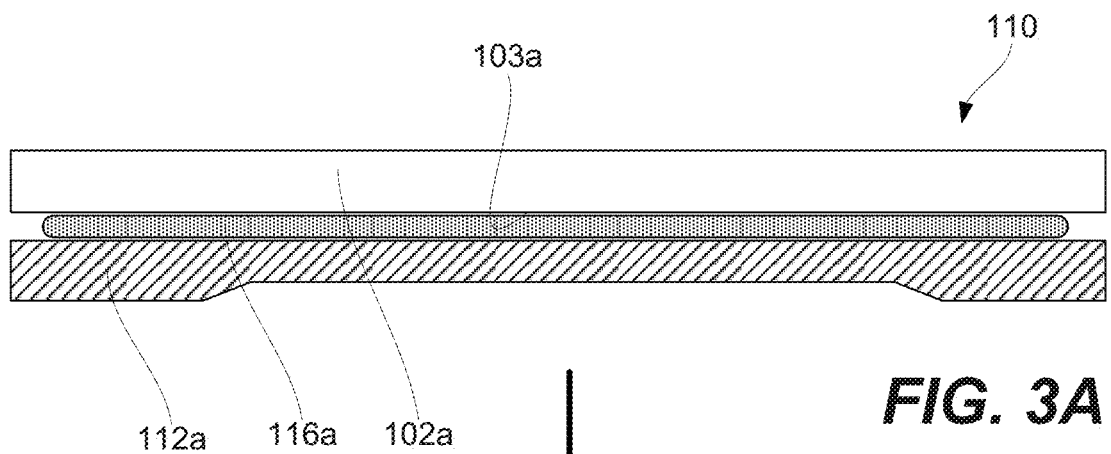
FIG. 3A is a schematic cross-sectional view of a stack of a bolster, pressure bladder, and die prior to applying any pressure inside a processing cavity formed by the die, in accordance with some embodiments.
Figure 3B:
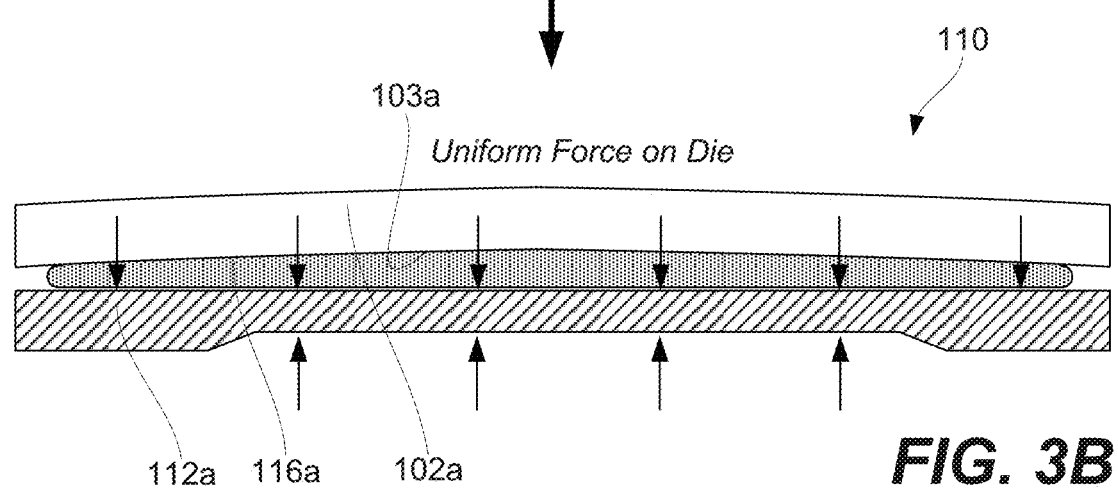
FIG. 3B is a schematic cross-sectional view of the stack of the bolster, pressure bladder, and die also shown FIG. 3A after to applying the pressure inside the processing cavity, in accordance with some embodiments.
Figure 3C:
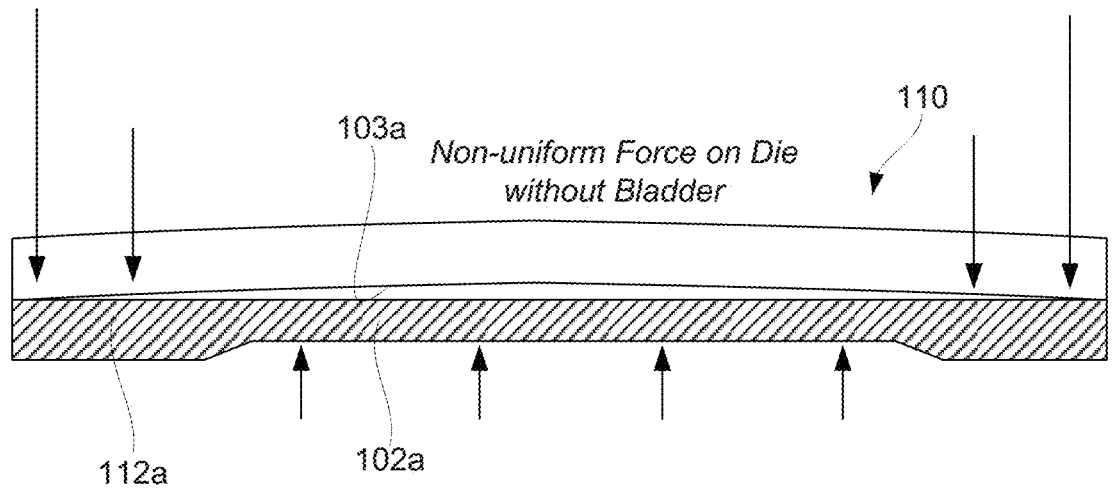
FIG. 3C is a schematic cross-sectional view of a stack including a bolster and die after applying the pressure inside the processing cavity, in accordance with some embodiments.

In some embodiments, contact surface 103a of first bolster 102a unevenly deforms away from first die 112a while the processing pressure is applied to processing cavity 114. First bladder 116a may fill all space between contact surface 103a of first bolster 102a and first die 112a above cavity 114 while contact surface 103a of first bolster 102a unevenly deforms away from first die 112a as schematically shown by FIGS. 3A and 3B.

In some embodiments, method 200 further comprises monitoring deformation of first bolster 102a while applying the processing pressure to processing cavity 114. The first pressure inside the first bladder 116a may be selected based on the level of deformation of first bolster 102a, e.g., a higher pressure may be used for higher levels of deformation.

In some embodiments, contact surface 103a of first bolster 102a does not directly contact first die 112a while applying the processing pressure to processing cavity 114. Likewise, contact surface 103a of second bolster 102b may not directly contact second die 112b while applying the processing pressure to processing cavity 114.

In some embodiments, controlling the first pressure inside first bladder 116a comprises controlling amount of gas inside first bladder 116a. For example, gas may be added into first bladder 116a (e.g., from gas source 154) or removed from first bladder 116a to adjust the pressure.

In the same or other embodiments, controlling the first pressure inside first bladder 116a comprises controlling a distance between contact surface 103a of first bolster 102a and first dies 112a. In other words, the volume available for first bladder 116a may change thereby changing the pressure inside first bladder 116a.

In some embodiments, induction heating cell 100 may include additional bladders, such as third bladder 116c and fourth bladder 116d as shown in FIG. 1C and described above with reference to this figure. First bladder 116a and second bladder 116b may be oriented along a first axis, while third bladder 116c and fourth bladder 116d may be oriented along a second axis not parallel to the first axis. For example, as shown in FIG. 1C, first bladder 116a and second bladder 116b may be oriented along the X axis, while third bladder 116c and fourth bladder 116d may be oriented along the Z axis, which is perpendicular to the X axis.

Third bladder 116c may be disposed between first die 112a third bolster 102c or, more specifically, between first die 112a and contact surface 103c of third bolster 102c. Fourth bladder 116d may be disposed between first die 112a and fourth bolster 102d or, more specifically, between first die 112a contact surface 103d of fourth bolster 102d. In this example, both third bladder 116c and fourth bladder 116d support first die 112a and prevent first die 112a from expanding and cracking. The considerations for design, position, and controlling pressures inside third bladder 116c and fourth bladder 116d may be different from those for first bladder 116a and second bladder 116b, which support different dies 112a and 112b. In some embodiments, contact surface 103c of third bolster 102c may be parallel to contact surface 103d of fourth bolster 102d. However, contact surface 103a of first bolster 102a may be perpendicular to the contact surface 103c of the third bolster 102c.

In some embodiments, third bladder 116c may be disposed between second die 112b and contact surface 103c of third bolster 102c in addition to being disposed between first die 112a and contact surface 103c of third bolster 102c. Likewise, fourth bladder 116d may be also disposed between second die 112b and contact surface 103d of fourth bolster 102d in addition to being disposed between first dies 112a and contact surface 103d of fourth bolster 102d.

Method 200 may comprise controlling a third pressure inside third bladder 116c and controlling a fourth pressure inside fourth bladder 116d. The third pressure and the fourth pressure may be independently controlled from the first pressure inside first bladder 116a and the second pressure inside second bladder 116b. In some embodiments, the ratio of the third pressure to the fourth pressure may be kept constant.

Experimental Data/Modeling

Figure 6:
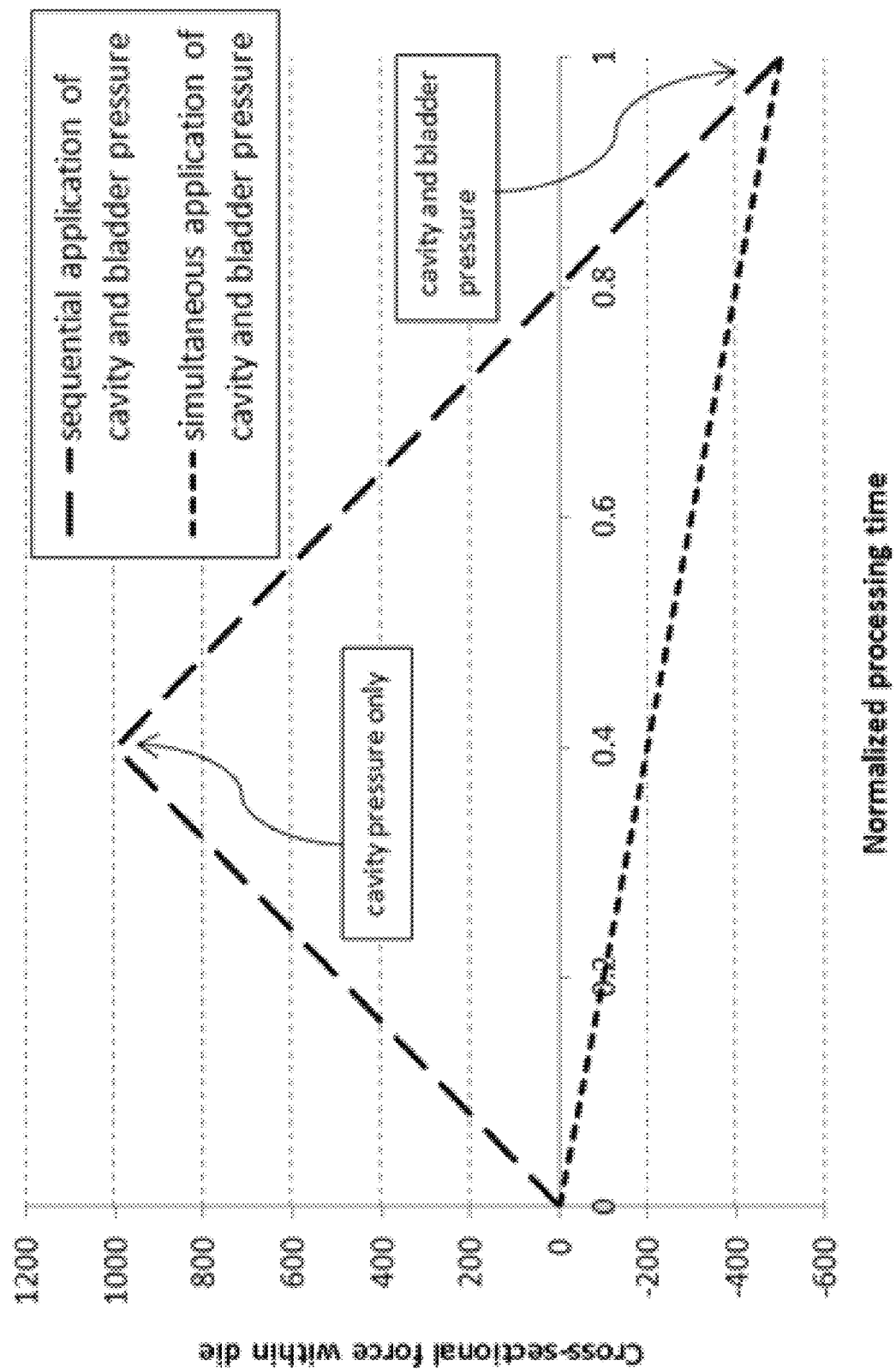
FIG. 6 illustrates the effect of the side bladders on the internal forces of the die showing that the brittle ceramic tool material can be kept in compression.

FIG. 6 is a plot of cross-sectional forces within a die, such as dies 102a and 102b described above, due to pressurization of processing cavity 114 and subsequent pressurization of bladders 116c and 116d. It can be seen that pressurizing side bladders 116c and 116d decrease the tensile forces within dies 102a and 102b and at a high enough pressure actually causes dies 102a and 102b to undergo compression loading. If the pressure inside processing cavity 114 the pressure inside side bladders 116c and 116d are applied simultaneously, dies 102a and 102b may never experience any tensile forces during the processing, which is important for eliminating cracks in the ceramic materials used to form dies 102a and 102b.

Examples of Aircraft and Methods of Fabricating and Operating Aircraft

Figure 7:
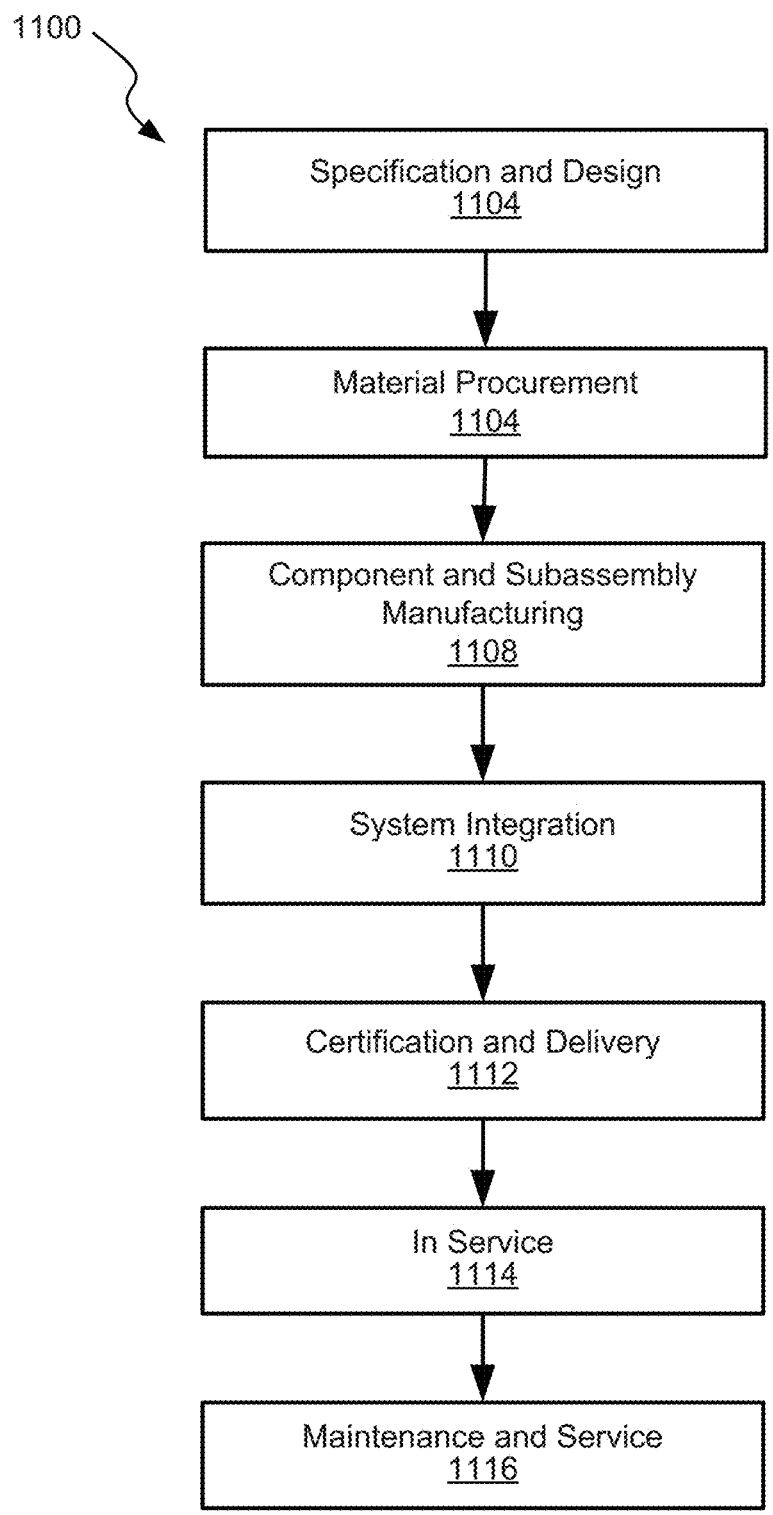
FIG. 7 is a block diagram of aircraft production and service methodology that may utilize methods and systems for curing composite structures without collapsing cavity sections as described herein.
Figure 8:
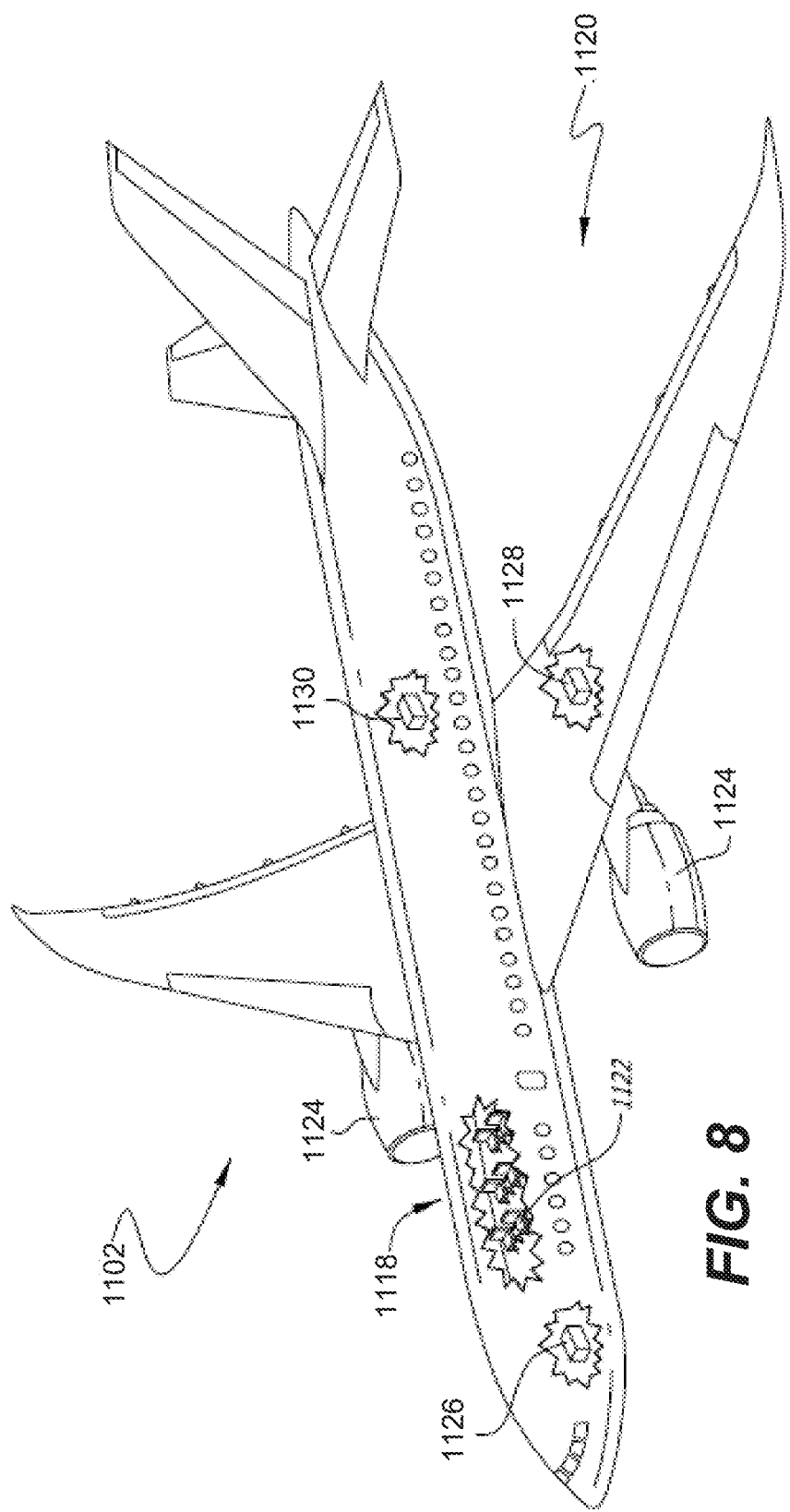
FIG. 8 is a schematic illustration of an aircraft that may include composite structures described herein.

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Induction heating cell 100 described above and corresponding methods of using induction heating cell 100 may be utilized during component and subassembly manufacturing (block 1108).

Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102.

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level inspection systems 1120 and interior 1122. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An induction heating cell comprising:
   a first die;
   a first bolster comprising a first contact surface facing the first die;
   a first bladder disposed between the first die and the first contact surface;
   a second die, wherein the first die and the second die form a process cavity; and
   a controller configured to:
      monitor a first deformation of the first bolster; and cause a gas source to pressurize the first bladder based on the first deformation, wherein the first deformation is monitored while the gas source is pressurizing the first bladder.

2. The induction heating cell of claim 1, further comprising:
the gas source coupled to the first bladder and configured to pressurize the first bladder.

3. The induction heating cell of claim 2, further comprising:
a valve coupled to the gas source and configured to regulate flow between the gas source and the first bladder.

4. The induction heating cell of claim 2, wherein the gas source is further coupled to the process cavity to pressurize the process cavity.

5. The induction heating cell of claim 4, further comprising:
a second bolster comprising a second contact surface facing the second die; and
a second bladder disposed between the second die and the second contact surface, wherein the gas source is further configured to pressurize the second bladder, and wherein the controller is further configured to:
monitor a second deformation of the second bolster; and
cause the gas source to pressurize the second bladder based on the second deformation.

6. The induction heating cell of claim 5, wherein the controller is further configured to:
determine a processing pressure inside the process cavity; and
cause the gas source to pressurize the process cavity based on the processing pressure.

7. The induction heating cell of claim 5, wherein the controller is further configured to:
cause the gas source to pressurize the first bladder based on a pressure of the second bladder.

8. The induction heating cell of claim 5, wherein the first die comprises a first opening, wherein the second die comprises a second opening, and wherein the induction heating cell further comprises:
a post configured to be disposed within the first opening and the second opening to align the first die relative to the second die.

9. The induction heating cell of claim 8, wherein the first opening, the second opening, or both the first die and the second die have cone shaped profiles.

10. The induction heating cell of claim 8, wherein the post is threaded into the first opening, the second opening, or both the first die and the second die.

11. The induction heating cell of claim 8, wherein a first cross-sectional profile, along a first plane, of the first opening is larger than a second cross-sectional profile, along the first plane, of the post.

12. The induction heating cell of claim 5, further comprising:
a third bolster comprising a third contact surface facing the first die;
a third bladder disposed between the first die and the third contact surface;
a fourth bolster comprising a fourth contact surface facing the first die; and
a fourth bladder disposed between the first die and the fourth contact surface.

13. The induction heating cell of claim 12, wherein the first die comprises a first side and a second side opposite the first side, wherein the third bladder is coupled to the first side, and wherein the fourth bladder is coupled to the second side.

14. The induction heating cell of claim 12, wherein the third contact surface is parallel to the fourth contact surface.

15. The induction heating cell of claim 1, further comprising a heating component configured to generate an electromagnetic field to heat at least a portion of a part disposed within the process cavity.

16. The induction heating cell of claim 15, wherein the heating component comprises an induction coil.

17. The induction heating cell of claim 15, wherein the first die, the second die, or both the first die and the second die are comprised of a material to allow passage of the electromagnetic field through the first die, the second die, or both the first die and the second die, respectively.

18. The induction heating cell of claim 1, wherein the first die comprises a die body and a tensioned rod disposed within the die body.

19. The induction heating cell of claim 1, wherein the first die comprises a first process cavity area and a first bladder support area, wherein the first process cavity area is configured to receive a part, wherein the first bladder support area is an area of contact between the first bladder and the first die, and wherein the first bladder support area is greater than the first process cavity area.

20. The induction heating cell of claim 1, wherein the first die comprises a ceramic.

* * * * *